(12) United States Patent
Liao et al.

(10) Patent No.: US 10,375,524 B2
(45) Date of Patent: Aug. 6, 2019

(54) IN-VEHICLE WORK ZONE COMMUNICATION

(71) Applicant: Regents of the University of Minnesota, Minneapolis, MN (US)

(72) Inventors: Chen-Fu Liao, Minneapolis, MN (US); Max Donath, Minneapolis, MN (US); Nichole Morris, Minneapolis, MN (US); John Hourdos, Minneapolis, MN (US); Stephen Zitzow-Childs, Cambridge, MA (US); Janet Creaser, New Brighton, MN (US); Christopher Edwards, Hugo, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/724,661

(22) Filed: Oct. 4, 2017

(65) Prior Publication Data

US 2018/0103350 A1  Apr. 12, 2018

Related U.S. Application Data

(60) Provisional application No. 62/405,585, filed on Oct. 7, 2016.

(51) Int. Cl.
| | |
|---|---|
| *H04W 4/80* | (2018.01) |
| *H04W 4/02* | (2018.01) |
| *H04W 8/00* | (2009.01) |
| *H04W 4/90* | (2018.01) |
| *H04W 4/021* | (2018.01) |
| *H04W 4/44* | (2018.01) |

(52) U.S. Cl.
CPC ............ *H04W 4/027* (2013.01); *H04W 4/80* (2018.02); *H04W 4/90* (2018.02); *H04W 8/005* (2013.01); *H04W 4/021* (2013.01); *H04W 4/44* (2018.02)

(58) Field of Classification Search
CPC ...................................... H04W 4/027
USPC ................. 455/404.1, 404.2, 456.3
See application file for complete search history.

(56) References Cited

U.S. PATENT DOCUMENTS

| | | | |
|---|---|---|---|
| 8,675,535 B2 * | 3/2014 | Finlow-Bates ... | H04W 52/0254 370/311 |
| 2003/0025597 A1 * | 2/2003 | Schofield ............... | B60Q 1/346 340/435 |
| 2003/0069784 A1 * | 4/2003 | Banerjee ................ | G06Q 30/04 705/13 |

(Continued)

OTHER PUBLICATIONS

Ashford, Researchers raise privacy concerns about Bluetooth Low Energy devices, http://www.computerweekly.com/news/4500246790/Researchers-raise-privacy-concerns-about-Bluetooth-Low-Energy-devices, 5 pages, accessed Jun. 2016.

(Continued)

*Primary Examiner* — Joel Ajayi
(74) *Attorney, Agent, or Firm* — Westman, Champlin & Koehler, P.A.; Theodore M. Magee (57) ABSTRACT

A method includes a mobile device traveling in a vehicle scanning for Bluetooth devices. When the mobile device detects a Bluetooth device, it then determines that the Bluetooth device is a work zone tag. The mobile device then issues a warning that indicates that the vehicle is near a work zone based on the work zone tag.

14 Claims, 6 Drawing Sheets

(56) References Cited

U.S. PATENT DOCUMENTS

2009/0253423 A1* 10/2009 Kullberg ............... H04M 1/66
455/419
2017/0018179 A1* 1/2017 Gutierrez ............... H04L 67/12

OTHER PUBLICATIONS

Chu et al., Evaluation of effectiveness of automated work zone information systems, Journal of the Transportation Research Board, No. 1911, pp 73-81, 2005.

Dunlap et al., Estimation of origin and destination information from Bluetooth and Wi-Fi sensing for transit, Transportation Research Record: Journal of the Transportation Research Board, No. 2595, pp. 11-17, 2016.

Haseman et al., Real time measurement of work zone travel time delay and evaluation metrics, Transportation Research Record: Journal of the Transportation Research Board, vol. 2169, pp. 40-53, 2010.

Ibrahim et al., Hybrid work zone information system with portable changeable message signs and dedicated short-range communication, Transportation Research Record: Journal of the Transportation Research Board, No. 2380, pp. 29-35, 2013.

Kwon et al., Development and field evaluation of variable advisory speed limit system for work zones, Transportation Research Record: Journal of the Transportation Research Board, No. 2015, pp. 12-18, 2015.

Liao, Development of a navigation system using Smartphone and Bluetooth technologies to help the visually impaired navigate work zones safely, Final Report, Minnesota Department of Transportation (MnDOT 2014-12), 86 pages, 2014.

Luttrell et al., Comparative analysis report: The benefits of using intelligent transportation systems in work zones, FHWAHOP-09-002, FHWS, USDOT, 2008.

Marfia et al., Vehicular congestion modeling and estimation for advanced traveler information systems, Proceedings of the International Federation for Information Processing Wireless Days, Venice, Italy, pp. 1-5, 2010.

Martchouk et al., Analysis of freeway travel time variability using Bluetooth detection, Journal of Transportation Engineering, vol. 137, No. 10, pp. 697-704, 2011.

Mattox et al., Development and evaluation of a speed-activated sign to reduce speeds in work zones, Transportation Research Record: Journal of the Transportation Research Board, No. 2015, pp. 3-11, 2007.

Mobile Telephony Market, https://www.bluetooth.com, 3 pages, accessed Jun. 2016.

Moghaddam et al., Real-time prediction of arterial roadway travel times using data collected by Bluetooth detectors, Transportation Research Record: Journal of the Transportation Research Board, No. 2442, pp. 117-128, 2014.

Quayle et al., Arterial performance measures using MAC Readers—Portland's Experience, North American Travel Monitoring Exposition & Conference, Seattle, WA, http://onlinepubs.trb.org/onlinepubs/conferences/2010/NATMEC/Quayle.pdf, 30 pages, accessed Jun. 2016.

Scriba et al., Creating smarter work zones, FHWA Public Roads, vol. 77, No. 5, https://www.fhwa.dot.gov/publications/publicroads/14marapr/06.cfm, 7 pages, accessed Jun. 2016.

Stevanovic, Testing accuracy and reliability of MAC Readers to measure arterial travel times, International Journal of Intelligent Transportation Systems Research, vol. 13, pp. 50-62, 2015.

Real-time work zone traffic control system using an automated traffic information system to reduce congestion and improve safety during reconstruction of the I-55 Lake Springfield Bridge in Illinois, Intelligent Transportation Systems in Work Zones: A Case Study, FHWAHOP-04-018, FHWS, U.S. Department of Transportation, 20 pages, 2004.

USDOT, FHWS, "Facts and Statistics—Work Zone Safety", http://www.ops.fhwa.dot.gov/wz/resources/facts_stats/safety.htm, 4 pages, accessed Jun. 2016.

USDOT, FHWA, "Benefits of Using Intelligent Transportation Systems in Work Zones—A Summary Report", http://www.ops.fhwa.dot.gov/wz/its/wz_its_benefits_summ/index_htm, 1 page, accessed Jun. 2016.

Real-time travel time estimates using media access control address matching, ITE Journal, vol. 78, No. 6, pp. 20-23, 2008.

Wegener et al., TraCI: An interface for coupling road traffic and network simulators, Proceedings of the 11th Communications and Networking Simulation Symposium, New York, pp. 155-163, 2008.

\* cited by examiner

FIG. 6 ns as soon
IN-VEHICLE WORK ZONE COMMUNICATION

CROSS-REFERENCE OF RELATED APPLICATION

The present application is based on and claims benefit of U.S. provisional patent application Ser. No. 62/405,585, filed Oct. 7, 2016, the content of which is hereby incorporated by reference in its entirety.

This invention was made with State of Minnesota support under 99088, WO #185 awarded by Minnesota. The State of Minnesota has certain rights in this invention.

BACKGROUND

According to work zone injury and fatality data published by the U.S. Federal Highway Administration (FHWA) in 2010, there were more than 87,600 crashes in work zones, resulting in 576 deaths and 37,476 injuries. More than 20,000 workers are injured in work zones each year, with 12% of those due to traffic incidents. The situation worsened in 2012; with 609 out of 33,561 road fatalities occurring in work zones. Moreover, challenges to work zone safety and mobility are exacerbated by the growing issue of distracted driving.

SUMMARY

A method includes a mobile device traveling in a vehicle scanning for Bluetooth devices. When the mobile device detects a Bluetooth device, it then determines that the Bluetooth device is a work zone tag. The mobile device then issues a warning that indicates that the vehicle is near a work zone based on the work zone tag.

In a further embodiment, a method includes scanning for Bluetooth-enabled devices in a work zone and detecting a Bluetooth-enabled device in the work zone. A user interface is displayed that accepts a message to be displayed on a mobile device when the Bluetooth-enabled device is detected by the mobile device. The message is sent to a database on a network so that the message can be forwarded to the mobile device by a server that accesses the database.

In a still further embodiment, a mobile device includes a Bluetooth communication module that receives a Bluetooth communication signal from a Bluetooth-enabled device in a work zone and a processor that based on the Bluetooth communication signal triggers an output device to generate an alert that the mobile device is in a work zone.

DETAILED DESCRIPTION OF ILLUSTRATIVE EMBODIMENTS

A mobile device application was developed and configured to run as a background service on mobile devices such as smartphones. This means that the application runs as soon as the mobile device turned on. The application constantly monitors the mobile device's location using a GPS module on the mobile device and periodically accesses a work zone database available on the internet to update a local work zone database that is stored in memory on the mobile device. In some embodiments, the work zone database is updated with only those work zones that are within a 50 miles radius of the current mobile device location. A continuous Bluetooth scan is initiated when a vehicle enters a geo-fenced work zone. When a work zone Bluetooth-enabled device, such as a Bluetooth Low Energy (BLE) tag, is detected, the application causes an audible message to be emitted. In some embodiments, an image and/or text associated with the BLE tag is also provided on the display of the mobile device. If the BLE tag is configured to trigger alerts based on speeding, the application will determine if the mobile device is moving faster than a speed limit set for the BLE tag and audibly announces "You are speeding" when this is true. When more than one BLE tag is detected, the BLE tag with the greatest signal strength is selected as the BLE tag to use for triggering alerts. When the vehicle leaves the geo-fenced work zone, the Bluetooth scanning service is automatically terminated by the application.

On account of privacy concerns, some embodiments include a 3-tier implementation that improves the data security of communication between client devices and the Internet-based database. Firmware of BLE long-range tags is set so that the tags operate in discovery mode with minimal power consumption (less than 30 mA). Each BLE tag is packaged in a NEMA enclosure along with a battery to protect the BLE tag and the battery. In one embodiment, the mobile device application and a work zone engineer's application discussed below only recognize Bluetooth-enabled devices that are programmed for the various embodiments. Other Bluetooth devices within the detection range are ignored.

In order to reduce the effort required to associate correct messages with each corresponding BLE tag at a construction site, another mobile device application was developed to allow engineers to input and update the alert messages on any site. This application is referred to herein as the work zone engineer's application. The work zone engineer's application automatically determines the location of the mobile device running the work zone engineer's application and identifies Bluetooth tags nearby. After entering corresponding messages using an authorized security code, the field engineer can submit the updated information to the central database using the work zone engineer's application. This approach allows workers to easily reconfigure the information in a work zone and to update alert messages in a timely manner.

Figure 1:
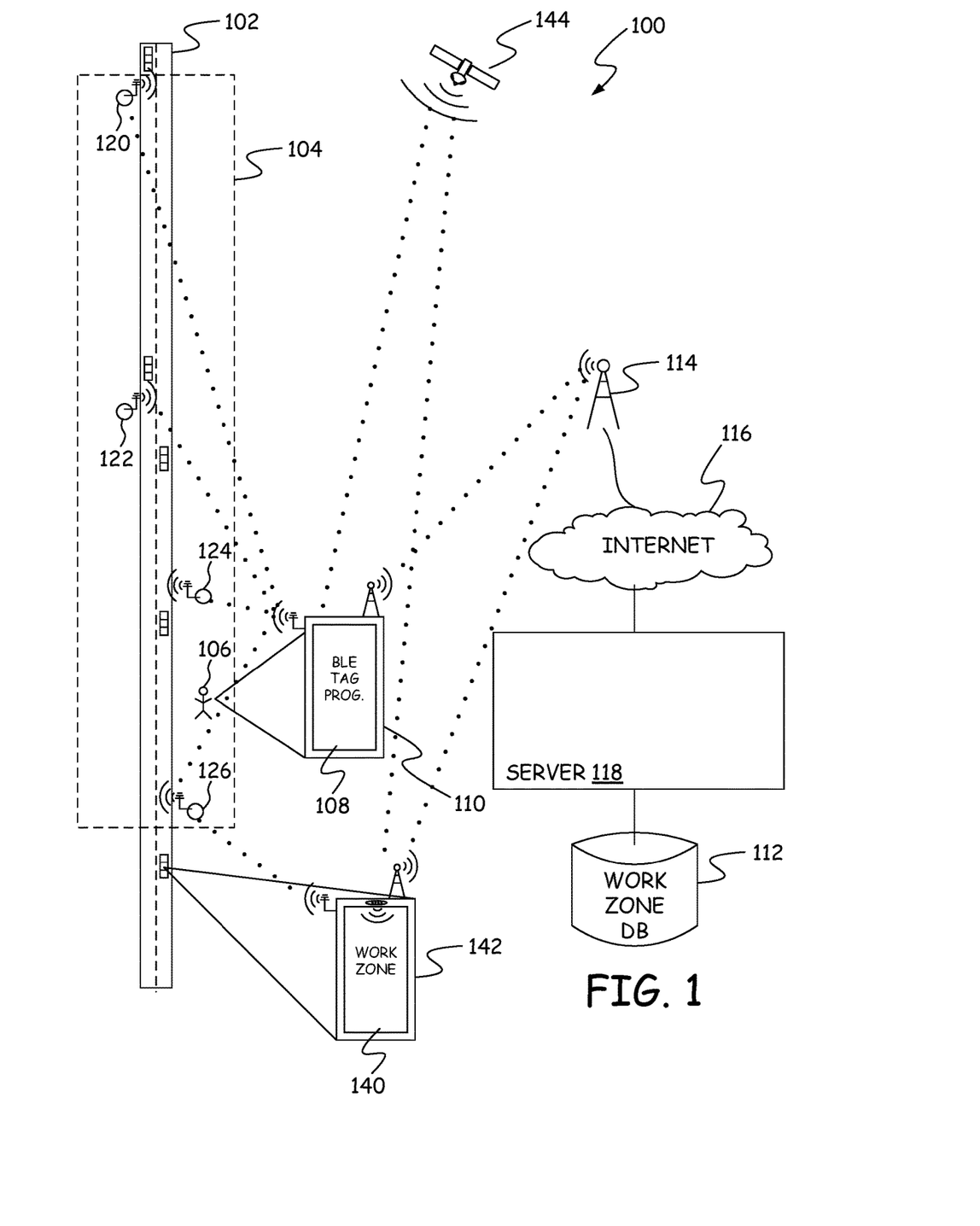
FIG. 1 provides a system diagram of a work zone communication system in accordance with one embodiment.

FIG. 1 provides a diagram of a system 100 that facilitates in-vehicle work zone communication in accordance with various embodiments. FIG. 1 depicts a roadway 102, which is undergoing repair. The area under repair is enclosed within a geo-fence 104, which is an area designated to encapsulate the work zone. This designation is typically not made with physical markers around the work zone but instead is simply designated in software. As shown in step 200 of the flow diagram of FIG. 2, a work zone engineer 106 uses a work zone engineer's application 108 on a mobile device 110 to define the geographical extend of geo-fence 104 and thus the geographical extent of the work zone in a work zone database 112. In particular, mobile device 110 communicates longitude and latitude values for the vertices of geo-fence 104 to a server 118 through a cellular network 114 and the internet 116 and then server 118 stores those values in a work zone database 112. The longitude and latitude values define the vertices of a polygon that describes the geo-fence around the work zone.

Figure 2:
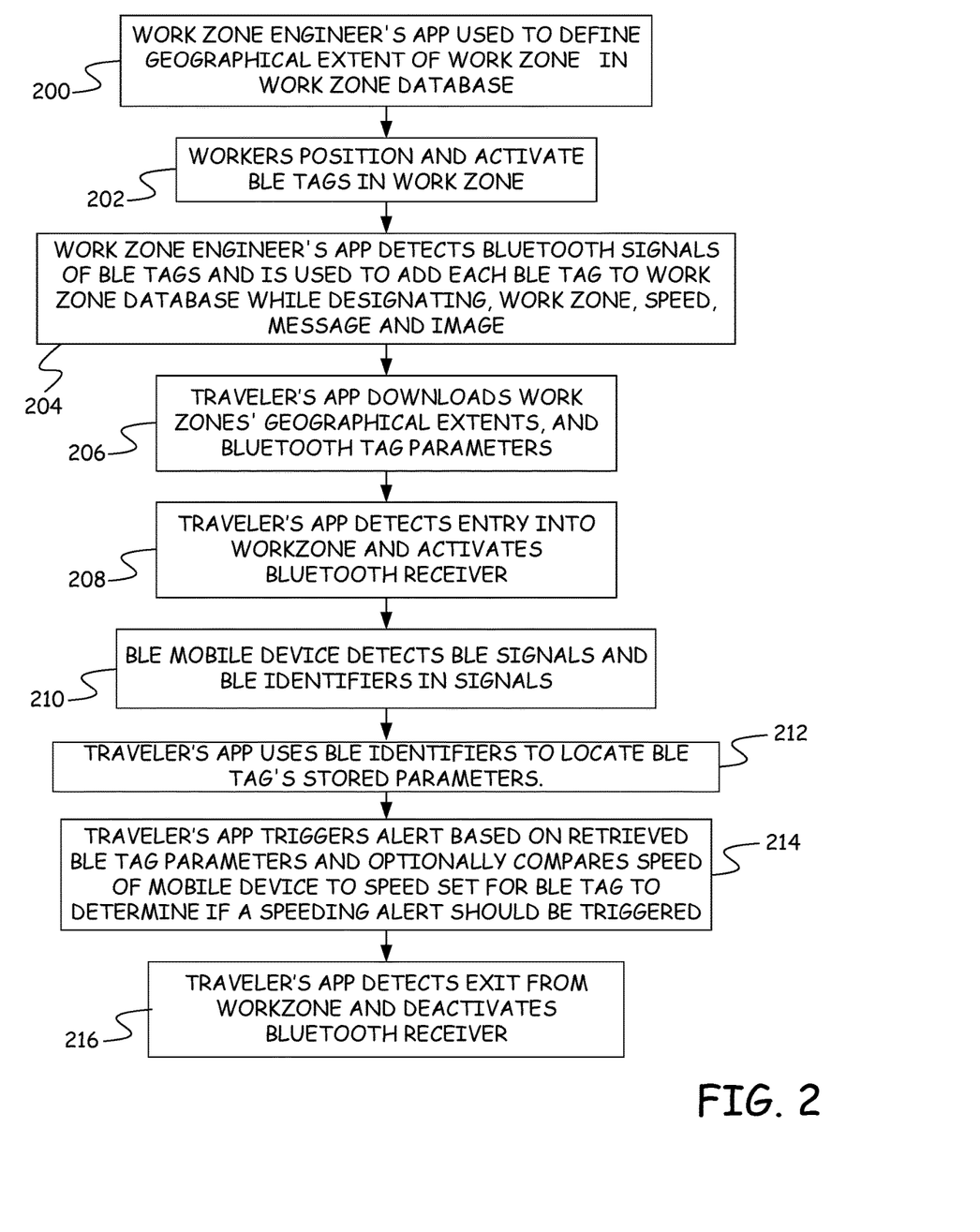
FIG. 2 provides a flow diagram of a method in accordance with one embodiment.

At step 202 of FIG. 2, workers position and activate Bluetooth Low Energy (BLE) tags, such as tags 120, 122, 124 and 126 within the work zone. The BLE tags are Bluetooth enabled devices that act as Bluetooth beacons, which transmit their identity on a Bluetooth frequency at regular intervals. In some embodiments, each BLE tag also transmits a longitude and latitude that describe the current position of the BLE tag. At step 204, work zone engineer's application 108 is used to detect the Bluetooth signals of the BLE tags in the work zone and is used to add each BLE tag to work zone database 112. While designating the work zone, the engineer is also able to use application 108 to set a speed value for the BLE tag, a message for the BLE tag, an image for the BLE tag and whether the BLE tag should trigger speeding warnings.

Figure 3:
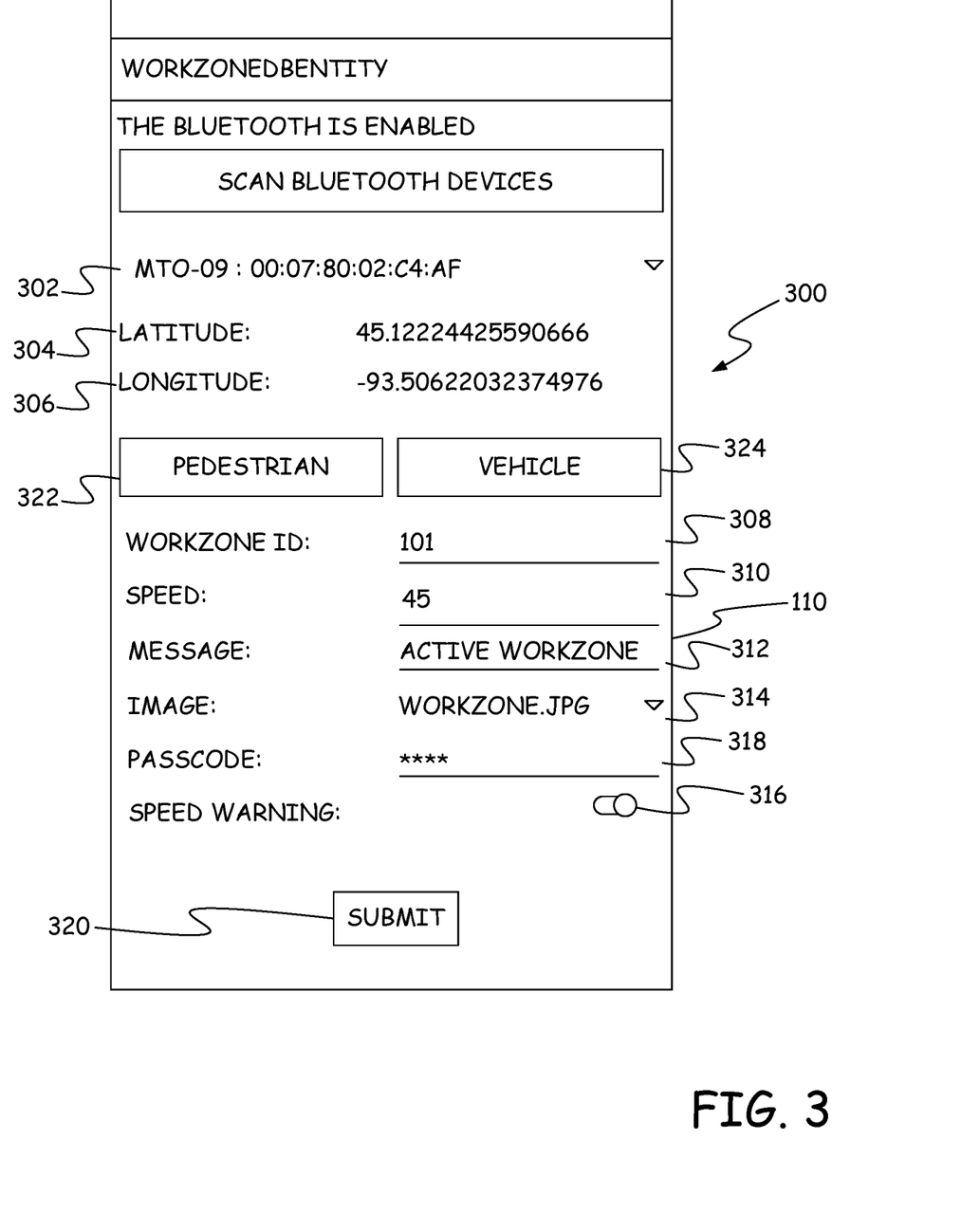
FIG. 3 provides an example of a user interface produced by a work zone engineer's application.

FIG. 3 provides an example user interface 300 on mobile device 110 produced by work zone engineer's app 108 to detect the Bluetooth signals of the BLE tags and to designate the work zone, speed value, message, image, and speeding trigger control to be associated with each BLE tag. In user interface 300, a BLE tag identifier 302 is shown for a BLE tag that has been detected by scanning for Bluetooth signals. In addition, the latitude 304 and longitude 306 of the BLE tag that has been detected is shown. User interface 300 includes a number of settable fields for the BLE tag including: WorkZone ID field 308, speed value field 310, message field 312 and image field 314. In addition, user interface 300 includes a speed warning control 316.

In accordance with one embodiment, WorkZone ID 308 may be automatically filled in by engineer's application 108 based on the current location of mobile device 110. In particular, engineer's application 108 is able to determine if mobile device 110 is within the geo-fence of a work zone and if it is, the WorkZone ID for that work zone is automatically placed into field 308. In other embodiments, the WorkZone ID is manually entered by the engineer in WorkZone ID field 308.

Speed value field 310 accepts a maximum speed for vehicles passing the BLE tag. Message field 312 accepts text that is to be converted into speech by mobile devices as the mobile devices approach the BLE tag. In other words, the text provided in message field 312 will be converted into an audible signal conveying the contents of the text. The text in message field 312 can include phrases such as "Active Work Zone", "Merge Ahead" or "Lane Change Ahead," for example. Image field 314 accepts a file name of an image to be displayed on mobile devices as the mobile devices approach the BLE tag identified in field 302.

Speed warning control 316 that designates whether an alert is to be issued if the mobile device is travelling in excess of the speed value set in field 310. Such an alert in one embodiment is an audible signal that states "You Are Speeding".

To prevent unauthorized changes to the parameters associated with BLE tags, user interface 300 includes a passcode field 318 that accepts a passcode or password associated with an engineer. This passcode authenticates the engineer to server 118 when the engineer selects submit button 320. In addition, upon the selection of submit button 320, the data in fields 302, 304, 306, 308, 310, 312, 314 and 316 are submitted to server 118, which then stores the information in work zone database 112.

In accordance with the embodiment shown in FIG. 3, each BLE tag can have different parameters set for pedestrians than for vehicles. For example, one set of messages and images are provided if the mobile device is being carried by a pedestrian and a second set of messages and images are provided if the mobile device is in a moving vehicle. To set the values in fields 308, 310, 312, 314 and 316 for a pedestrian, pedestrian button 322 is selected. To set these values for a mobile device in a vehicle, button 324 is selected.

At step 206 of FIG. 2, a traveler's application 140 operating on a mobile device 142 downloads the geographical extents of a plurality of work zones near mobile device 142 as well as the Bluetooth tag parameters in those work zones from work zone database 112. In accordance with one embodiment, only those work zones within a 50 mile radius of mobile device 142 are downloaded. The current position of mobile device 142 can be determined from a GPS signal generated by a satellite 144 by a position module within mobile device 142.

Figure 4:
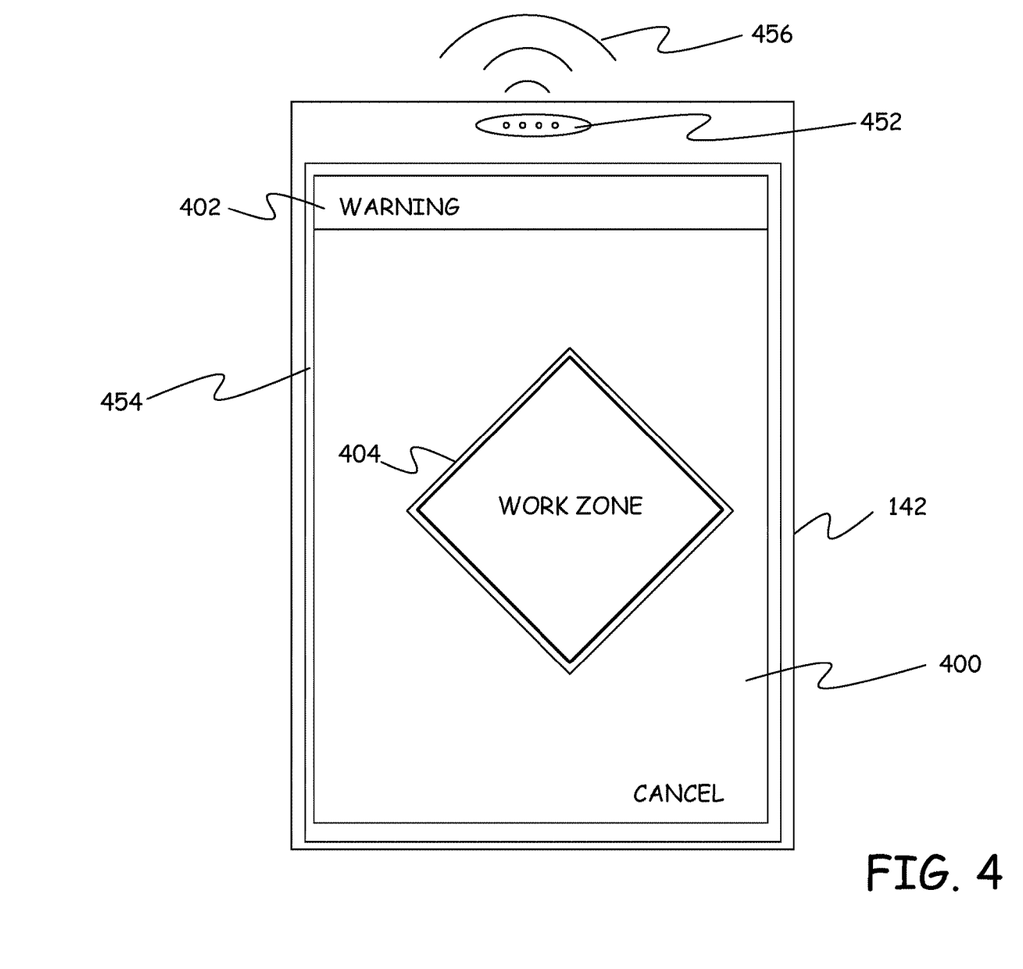
FIG. 4 provides an example of a user interface showing a warning image on a mobile device application.

At step 208, traveler's application 140, which is operating in the background of mobile device 142, detects that it is entering a work zone stored in the memory of mobile device 142 by comparing the position of mobile device 142 provided by a position module in mobile device 142 to the geo-fence of the work zone. Upon detecting entry into the work zone, mobile device 142 activates a Bluetooth communication module and begins to scan for Bluetooth-enabled devices. At step 210, the mobile device detects a Bluetooth signal of a Bluetooth tag it is approaching in the work zone and decodes the identifier of the Bluetooth tag from that signal. At step 212, traveler's application 140 uses the identifier for the Bluetooth tag to locate the parameters of that tag that are stored in the memory of mobile device 142. The stored parameters include the speed value, the text of the alert message, and the image associated with the Bluetooth tag as well as the designation of whether a speeding warning is to be issued when approaching or passing this Bluetooth tag. In other embodiments, instead of storing the text of the alert message, speech corresponding to the text of the alert message is stored. In such embodiments, server 118 converts any text it receives for alert messages into speech and stores the speech in work zone database 112 for the work zone. At step 214, the traveler's application 140 triggers a base alert based on the retrieved Bluetooth tag parameters and optionally compares the speed of the mobile device to the speed set for the Bluetooth tag to determine if a speeding alert should be triggered. The base alert for the Bluetooth tag includes an audible signal formed by converting the text of the message stored for the tag into audible speech (if server 118 has not previously performed this conversion) and a visual display of the image associated with the Bluetooth tag. The speeding alert, if any, consists of an audible signal that states "You are Speeding" in accordance with one embodiment. FIG. 4 shows a front view of mobile device 142 showing a speaker 452 and a display 454. The audible signal 456 of the base alert or the speeding alert is emitted by speaker 452. An image 400 associated with a Bluetooth tag is displayed on display 454. Image 400 includes a warning heading 402 and a work zone icon 404.

Figure 5:
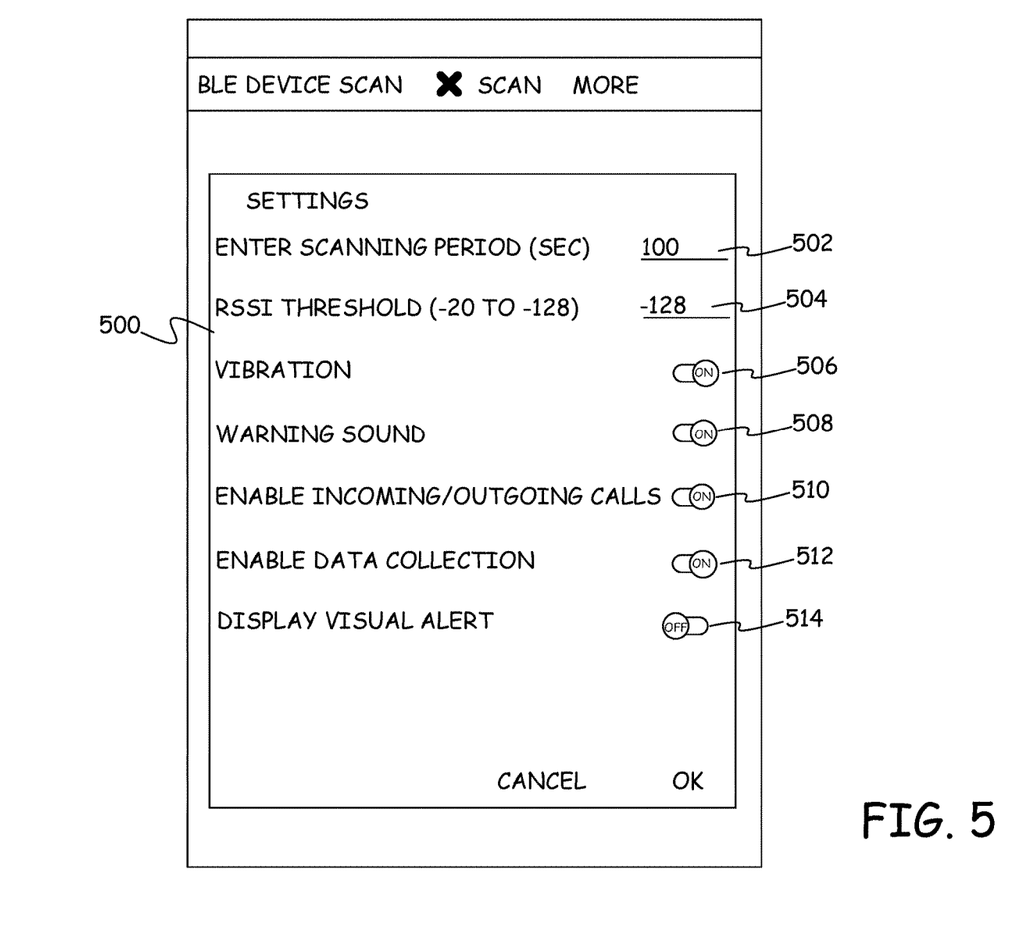
FIG. 5 provides an example of a user interface allowing a user to control settings of the mobile device application.

In accordance with one embodiment, users are able to control some aspects of mobile application 140 as shown in settings control user interface 500 of FIG. 5. In FIG. 5, the user is able to control how often the mobile device scans for Bluetooth tags using scanning control 502 as well as a threshold signal strength that a Bluetooth tag's signal must reach to trigger an alert using signal strength control 504. A user can control whether the mobile device vibrates when a work zone warning is issued using vibration control 506 and can control whether an audible warning is issued using warning sound control 508. The user can also control whether they can receive phone calls while in a work zone using control 510 and whether they receive a visual alert using visual alert control 512. In addition, the user can control whether data concerning their use of the application is collected using control 512.

Returning to FIG. 2, when traveler's application 140 detects that mobile device 142 has exited the work zone by comparing the position of mobile device 142 to the boundaries of the geo-fence for the work zone, traveler's application 140 deactivates the Bluetooth communication module at step 216. Deactivating the Bluetooth communication module conserves battery on mobile device 142. Thus, through steps 208 and 216, the Bluetooth communication module is only activated when the mobile device is in a geo-fence for a work zone. In some embodiments, if the Bluetooth communication module was on before entering the work zone, it remains on after leaving the work zone.

In other embodiments, traveler's application 140 activates the Bluetooth communication module before the mobile device enters the geo-fence for a work zone so that mobile device 142 begins scanning for Bluetooth enabled devices before actually reaching the work zone. This activation can be achieved by tracking the movement of mobile device 142 and predicting that mobile device 142 is approaching a work zone.

Figure 6:
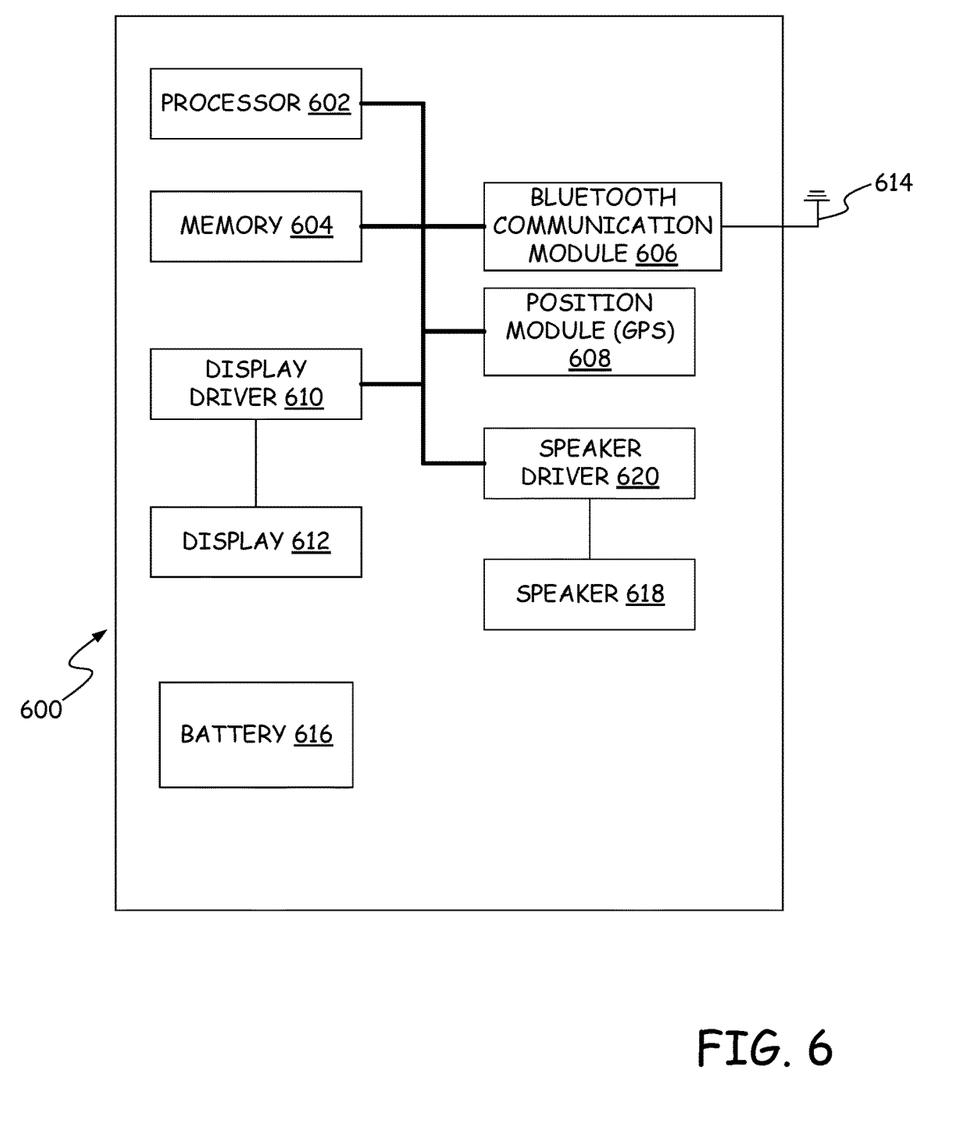
FIG. 6 is a block diagram of a mobile device.

FIG. 6 provides a block diagram of a mobile device 600 that can be used as mobile device 142 and mobile device 110. Mobile device 600 includes a processor 602, a memory 604, a Bluetooth communication module 606, a position module 608, a display driver 610, a display 612, a battery 616, a speaker driver 620 and a speaker 618. Battery 616 powers all of the elements of mobile device 600 in accordance with one embodiment.

Memory 604 includes instructions that are executed by processor 602 to implement the methods described above. In accordance with one embodiment, these instructions include a text-to-speech application that is able to convert the text of an alert message into audible speech. Memory 604 also includes work zone information including the geographic extent of work zones, the identity of Bluetooth tags in each work zone, and the parameters associated with each Bluetooth tag including the Bluetooth tag's speed value, warning message, warning image, and designation of whether a speed warning is to be issued on the mobile device when the mobile device moves past the Bluetooth tag.

Bluetooth communication module 606 receives Bluetooth signals through a Bluetooth antenna 614 and decodes those signals to find the identifiers for Bluetooth enabled devices that are generating the Bluetooth signals. Bluetooth communication module 606 can be activated and deactivated by processor 602 and can provide the identity of Bluetooth devices it has detected to processor 602 and memory 604.

Position module 608 provides the current position and a current speed of mobile device 600. In accordance with some embodiments, position module 608 is a global positioning satellite (GPS) module that is able to determine the position of mobile device 600 using GPS signals such as those generated by satellite 144 of FIG. 1 and is able to calculate a current speed based on current and past position values. The position and speed information generated by position module 608 is provided to processor 602 as it executes application 140. Other positioning systems may be used, such as those based on cellular tower locations and Bluetooth beacons.

Display driver 610 receives image information selected by processor 602 for display on display 612 including the image information for the user interfaces of FIGS. 3, 4 and 5. Display driver 610 sends the image information to display 612 and receives touch inputs generated by display 612 that indicate where a user has touched display 612. In this way, users can enter information in the user interfaces described above by simply touching display 612 in the appropriate areas.

Speaker Driver 620 drives speaker 618 to produce the audible alerts described above. In particular, speaker driver 620 receives values representing an audible signal either from processor 602 or from memory 604 and uses those values to drive speaker 618. In embodiments where the alert messages are stored as text in memory 604, processor 602 retrieves the text from memory 604 and executes a text-to-speech application to convert the text into audio data representing the sound of the spoken text. Processor 602 then provides the audio data to speaker driver 620 directly or buffers the audio data in memory 604 before providing the audio data to speaker driver 620. In embodiments where the audio data representing the alerts is stored in memory 604, the audio data is transferred from memory 604 to speaker driver 620.

Experiment Results

We conducted several experiments on a residential street (traveling at 45 MPH) and at the MnROAD facility (traveling up to 70 MPH) by placing a traffic barrel on the shoulder of a roadway. The BLE tag was placed on top of the barrel with its antenna facing toward the incoming traffic. The results indicated that the smartphone app is able to successfully detect the long-range BLE tag placed on the roadside. A test vehicle traveled at 70 MPH on the MnROAD test facility in Albertville, Minn. It traveled on the inner loop (in the northwest direction) towards a BLE tag placed on a traffic barrel on the shoulder. The smartphone app recorded the GPS latitude and longitude coordinates when the BLE tag was detected. The estimated Bluetooth detection range at 70 MPH was about 125 meters ahead of the barrel.

Although the embodiments discussed above have reference using the Bluetooth Low Energy protocol, in other embodiments other wireless communication protocols can be used to implement the tags in the work zone.

Although elements have been shown or described as separate embodiments above, portions of each embodiment may be combined with all or part of other embodiments described above.

Although the present invention has been described with reference to preferred embodiments, workers skilled in the art will recognize that changes may be made in form and detail without departing from the spirit and scope of the invention.

What is claimed is:

1. A method comprising:
 a mobile device traveling in a vehicle determining a geographic location of the mobile device and using the geographic location of the mobile device to determine whether to initiate scanning for Bluetooth devices wherein using the geographic location of the mobile device to determine whether to initiate scanning for Bluetooth devices comprises comparing the geographic location of the mobile device to each of a plurality of work zone areas using parameters describing the geographic extent of the plurality of work zones that are stored in the mobile device and changing from having scanning for Bluetooth devices disabled to enabling scanning for Bluetooth devices when the mobile device enters one of the work zone areas;

after initiating scanning, the mobile device detecting a Bluetooth device and determining that the Bluetooth device is a work zone tag;

the mobile device issuing a warning that indicates that the vehicle is near a work zone based on the work zone tag;

the mobile device determining a speed of the mobile device, comparing the speed to a speed provided for the work zone tag and issuing a speeding alert when the speed of the mobile device exceeds the speed provided for the work zone tag; and the mobile device disabling scanning for Bluetooth devices when the mobile device leaves a work zone area.

2. The method of claim 1 wherein issuing the speeding alert comprises issuing an audible signal.

3. The method of claim 1 further comprising displaying a message associated with the work zone tag on the mobile device.

4. The method of claim 1 further comprising displaying an image associated with the work zone tag on the mobile device.

5. The method of claim 1 wherein issuing the warning comprises issuing an audible signal.

6. A method comprising:

scanning for Bluetooth-enabled devices in a work zone using a first device;

detecting a Bluetooth-enabled device in the work zone using the first device;

displaying a user interface on the first device that includes a control to designate whether a mobile device in a vehicle in the work zone should trigger speeding warnings when the mobile device detects the Bluetooth-enabled device and that accepts a speed value and a warning message designated by a user of the first device that indicates that the vehicle is near a work zone based on the Bluetooth-enabled device to be conveyed by a mobile device when the Bluetooth-enabled device is detected by the mobile device;

sending the speed value and the message accepted through the user interface and an identifier for the Bluetooth-enabled device from the first device to a database on a network so that the speed value and the message can be forwarded to the mobile device by a server that accesses the database.

7. The method of claim 6 wherein detecting a Bluetooth-enabled device comprises receiving the identifier for the Bluetooth-enabled device from the Bluetooth-enabled device.

8. The method of claim 6 wherein the user interface includes a field for a passcode such that the database is only updated with the message if the passcode matches a passcode stored for an authorized user.

9. The method of claim 6 wherein detecting a Bluetooth-enabled device comprises receiving location information that describes a location of the Bluetooth-enabled device.

10. The method of claim 6 wherein the message to be conveyed by the mobile device comprises text to be conveyed as an audible signal by the mobile device.

11. A mobile device comprising:

a memory storing:
an alert received from a server database that received the alert from a user device wherein the alert is associated with a Bluetooth-enabled device and is stored in memory before the mobile device has detected the Bluetooth-enabled device, the alert indicating that the mobile device is in a work zone;
geographic descriptions of a plurality of work zones;

a Bluetooth communication module that receives a Bluetooth communication signal from the Bluetooth-enabled device;

an output device;

a position module that provides information describing a geographic position of the mobile device and that provides a speed for the mobile device; and a processor that:
enables the Bluetooth communication module scanning upon determining that the geographic position of the mobile device is within one of the plurality of work zones and disables the Bluetooth communication module scanning upon determining that the geographic position of the mobile device is outside of all of the plurality of work zones;
based on the Bluetooth communication signal triggers the output device to generate the alert; and
accesses a speed value associated with the Bluetooth-enabled device, compares the speed value to the speed of the mobile device, and generates a speeding warning when the speed of the mobile device exceeds the speed value.

12. The mobile device of claim 11 wherein the alert is an audible alert.

13. The mobile device of claim 12 wherein the alert is a message associated with the Bluetooth-enabled device.

14. The mobile device of claim 11 wherein the memory stores a speed value, a text message and an image associated with each of a plurality of Bluetooth-enabled devices in the work zone.

* * * * *